United States Patent [19]

Baran

[11] Patent Number: 5,425,027
[45] Date of Patent: Jun. 13, 1995

[54] WIDE AREA FIBER AND TV CABLE FAST PACKET CELL NETWORK

[75] Inventor: Paul Baran, Atherton, Calif.

[73] Assignee: COM21, Inc., Atherton, Calif.

[21] Appl. No.: 373

[22] Filed: Jan. 4, 1993

[51] Int. Cl.[6] .............................. H04J 1/10; H04J 3/16
[52] U.S. Cl. .................................... 370/69.1; 370/85.8;
 370/94.2; 370/95.2; 348/11; 340/825.08
[58] Field of Search ...................... 370/94.1, 95.2, 95.1,
 370/69.1, 80, 85.8, 124; 340/825.06, 825.07,
 825.08, 825.52, 825.54; 455/54.2, 6.1; 358/86;
 348/10, 11

[56] References Cited

U.S. PATENT DOCUMENTS

| | | | |
|---|---|---|---|
| 2,957,047 | 10/1990 | Wennemer | 379/211 |
| 4,191,860 | 3/1980 | Weber | 379/115 |
| 4,245,245 | 1/1991 | Matsumoro et al. | 358/122 |
| 4,322,845 | 3/1982 | Fennel et al. | 370/95.3 |
| 4,356,484 | 10/1982 | Eckhardt | 340/825.03 |
| 4,404,514 | 9/1983 | Reichert, Jr. | 455/5.1 |
| 4,430,731 | 2/1984 | Gimple et al. | 370/30 |
| 4,521,881 | 6/1985 | Stapleford et al. | 370/72 |
| 4,530,008 | 7/1985 | McVoy et al. | 358/86 |
| 4,533,948 | 8/1985 | McNamara et al. | 358/122 |
| 4,534,024 | 8/1985 | Maxemchuck et al. | 370/85.1 |
| 4,577,312 | 3/1986 | Nash | 370/112 |
| 4,633,462 | 12/1986 | Stifle et al. | 358/86 |
| 4,689,619 | 8/1987 | O'Brien, Jr. | 370/95.2 |
| 4,698,841 | 10/1987 | Haselton et al. | 370/60 |
| 4,717,970 | 1/1988 | Long | 358/86 |
| 4,751,510 | 6/1988 | de Saint Michel et al. | 370/84 |
| 4,763,317 | 8/1988 | Lehman et al. | 370/60 |
| 4,763,322 | 8/1988 | Eizenhofer | 370/95.1 |
| 4,763,323 | 8/1988 | Nelson | 370/95.2 |
| 4,764,920 | 8/1988 | Furuya | 370/94.1 |
| 4,768,188 | 8/1988 | Barnhart et al. | 370/84 |
| 4,771,425 | 9/1988 | Baran et al. | 370/85 |

(List continued on next page.)

OTHER PUBLICATIONS

Leland L. Johnson and David P. Reed, *Residential Broadband Services by Telephone Companies?*, Technology, Economics, and Public Policy, RAND, R-39-06-MF/RL, Jun. 1990, pp. v-ix.

James Chiddix and Ronald Wolfe, Communications Engineering and Design, *Fiber optic implementation, A case study*, Sep. 1989, pp. 8, 14, 16, 19, 21-22.

*Primary Examiner*—Douglas W. Olms
*Assistant Examiner*—Chau T. Nguyen
*Attorney, Agent, or Firm*—Allston L. Jones

[57] ABSTRACT

53 byte length ATM compliant cells are transmitted over a digital optical fiber path to interconnect with a coaxial feeder cable TV system to support two-way digital services at a plurality of sites connected to the TV cable system. At the point of interconnection between the fiber optic path and the cable TV feeder subsystem, digital signals are converted to a UHF rf carrier frequency above the cutoff pass-band of the analog signal feeder amplifier carrying TV broadcast signals. This rf carrier conveys a high data rate digitally modulated signal limited to sections of feeder cable between the cable TV broadcast channel amplifiers. In-house access to this UHF carrier signal is via the normal TV cable tap and drop cable to a SIU, located near the subscriber's TV set. The feeder cable and the passive taps used in cable TV practice have a higher cutoff frequency than the feeder amplifiers themselves. This allows passage of an UHF signal over the feeder cable. Low pass filters at the feeder amplifiers prevent this UHF signal from being shorted out by the in-cable amplifiers. Each SIU so connected sends and receives the UHF carrier signal, which conveys the ATM type cells. Each cell's payload contains the local address of the source and destination of that cell. Each SIU decodes each cell's address and accepts only those cells that are for itself. The SIUs speak to and receive signals from an FTU located at the TV cable headend or at a fiber connection node. The common channel conveying the ATM cells alternatively sends and receives cells in a ping-pong fashion.

18 Claims, 8 Drawing Sheets

U.S. PATENT DOCUMENTS

| | | | |
|---|---|---|---|
| 4,797,879 | 1/1989 | Habbab et al. | 370/3 |
| 4,819,228 | 4/1989 | Baran et al. | 370/85.1 |
| 4,829,297 | 5/1989 | Ilg et al. | 340/825.5 |
| 4,860,379 | 8/1989 | Schoeneberger et al. | 455/5.1 |
| 4,901,340 | 2/1990 | Parker et al. | 379/60 |
| 4,903,261 | 2/1990 | Baran et al. | 370/110.1 |
| 4,920,533 | 4/1990 | Dufresne et al. | 370/85.2 |
| 4,933,935 | 6/1990 | Adams | 370/85.7 |
| 4,949,395 | 8/1990 | Rydbeck | 455/33.1 |
| 4,956,839 | 9/1990 | Torii et al. | 370/60 |
| 4,959,862 | 9/1990 | Davidov et al. | 380/10 |
| 4,961,188 | 10/1990 | Lau | 370/94.2 |
| 4,970,717 | 11/1990 | Haas | 370/60 |
| 4,972,505 | 11/1990 | Isberg | 455/3.1 |
| 4,980,886 | 12/1990 | Bernstein | 370/95.3 |
| 4,980,907 | 12/1990 | Raith et al. | 379/63 |
| 4,982,440 | 1/1991 | Dufresne et al | 445/4.1 |
| 4,991,172 | 2/1991 | Cidon et al. | 370/94.1 |
| 4,991,206 | 2/1991 | Blais | 380/7 |
| 4,998,247 | 3/1991 | Irvine-Halliday et al. | 370/94.1 |
| 5,001,707 | 3/1991 | Kositpaiboon et al. | 370/94.1 |
| 5,007,043 | 4/1991 | Van Den Dool et al. | 370/60 |
| 5,010,329 | 4/1991 | Nagakura | 370/95.2 |
| 5,012,469 | 4/1991 | Sardana | 370/95.3 |
| 5,016,245 | 5/1991 | Lobjinski et al. | 370/60 |
| 5,029,163 | 7/1991 | Chao et al. | 370/95.1 |
| 5,067,123 | 11/1991 | Hyodo et al. | 370/58.1 |
| 5,111,454 | 5/1992 | Hung et al. | 370/95.3 |
| 5,115,431 | 5/1992 | Williams et al. | 370/94.1 |
| 5,124,980 | 7/1992 | Maki | 370/77 |
| 5,130,793 | 7/1992 | Bordry et al. | 455/5.1 |
| 5,132,680 | 7/1992 | Tezuka et al. | 340/825.08 |
| 5,138,649 | 8/1992 | Krisbergh et al. | 379/56 |
| 5,161,154 | 9/1992 | Diaz et al. | 370/95.1 |
| 5,241,534 | 8/1993 | Omuro et al. | 370/16 |

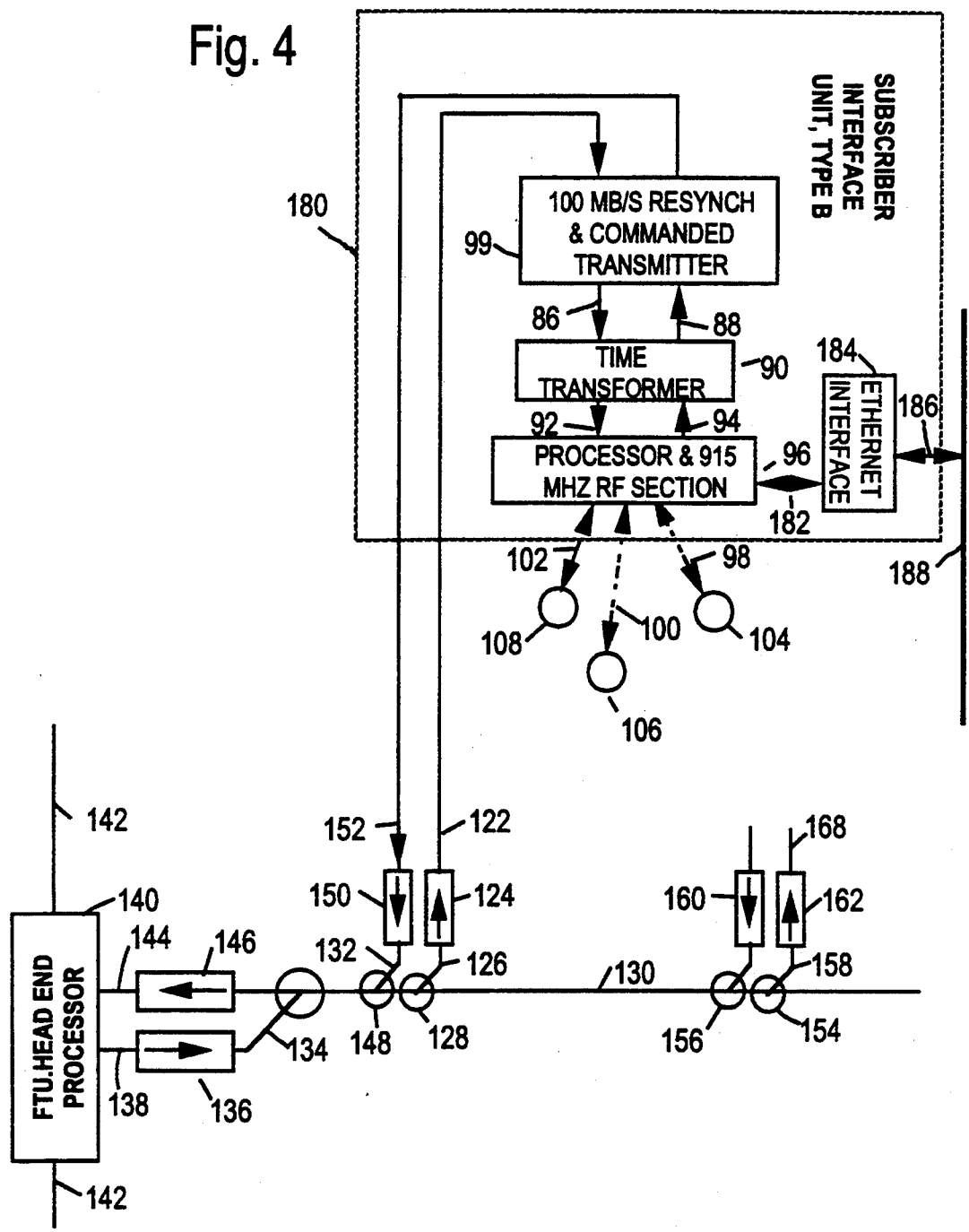

WIDE AREA FIBER AND TV CABLE FAST PACKET CELL NETWORK

FIELD OF THE INVENTION

The present invention relates to Metropolitan Area Networks (MANs) using ATM (Asychronous Time Multiplexing) fast packet cells transmitted over fiber optics transmission links. And, in particular it relates to such systems incorporating cable TV systems as a feeder transmission path for delivery of two-way digital services to homes and business.

BACKGROUND OF THE INVENTION

Prior Art

In an earlier U.S. patent application entitled "*CELL BASED WIDE AREA NETWORK ALTERNATIVE ACCESS TELEPHONE AND DATA SYSTEM*" having Ser. No. 07/953,744, filed on Sep. 29, 1992, by the same inventor as the present application, an ATM compliant cell based communications network is described. That network uses a bi-directional fiber transmission path to a conventional feeder cable TV system to a shared radio channel to poll a multiplicity of cordless telephones and other devices. In that earlier patent application, a multiplicity of separate frequency division channels, each carries a 2 Mb/s signal to and from each set top SIU (Subscriber Interface Unit) unit to the FTU (Fiber Terminating Unit) located at the cable TV system head-end. In that application, the upstream (toward the headend) transmission is limited to the 5–30 MHz range, a de facto standard upstream band as commonly used by the cable TV industry today. The downstream cells are carried within the cable's normal TV broadcast band.

Having a capacity of only about 25 MHz available in the upstream channel is very limiting since very high data rates are required to connect LANS (Local Area Networks), for example. Compounding this restriction, only about 12 MHz is truly available since (1) it is necessary to use this band to support other upstream cable TV services, and (2) it is necessary to avoid frequencies carrying HF broadcast and amateur signals that also use this band, as strong signals can leak into the feeder cable if the flexible drop cable sheaths weather and fracture and/or connectors become loose. A multiplicity of simultaneous 2 Mb/s signals, each on a separate 533 KHz FDM (Frequency Division Multiplexed) carrier are multiplexed together in that system. This further requires low-distortion analog transmission and requires the use of expensive analog signal optic fiber transmitters and receivers, rather than lower cost simpler digital fiber arrangements that are used in the present invention. Further, additional equipment is required upstream by the prior invention to multiplex and de-multiplex each 0.533 MHz carrier.

In the prior referenced patent application, a novel form of dynamic polling was used that was limited solely to dynamically polling nearby radio devices. In that application the total shared data rate of the polled devices was only 2 Mb/s. And, the distances were on the order of a hundred feet or so, which permitted an efficient polling technique. However, when the data rate is increased to the order of 100 Mb/s, and where distances can be in several kilometers rather than tens of meters, then a new form of polling becomes necessary. The known options for sharing bus structure include polling, token passing and random access with collision retransmission. As the ATM cell packet is short, the data rate high, and path length long, simple polling requires too long a time between allowable transmissions to be efficient. Token passing is better suited to a peer-to-peer configuration and not appropriate to the present many-to-one architecture, i.e. many SIUs and one FTU. And, random access with collisions does not provide the guarantee of delivery to support voice in an optimal manner.

The present invention overcomes these earlier limitations by significantly increasing the allowable upstream data rate from each subscriber in the system using frequencies otherwise not usable. A common shared high speed digital transmission channel is used in lieu of multiple FDM 533 KHz carriers. The overall capacity is increased and the number of components and their cost significantly reduced by using a PON (Passive Optic Network) fiber optic path which does not require active components, and offers improved reliability. The band of rf frequencies available above the range of the cable TV amplifier that can pass through the taps and coaxial cable, not otherwise usable, is generally wide. In many cases, it is able to support a common, shared channel in the 45 to 155 Mb/s range. To effectively share this common channel, a new multiplexing approach has been created to load balance each SIU competing for the single shared channel capacity.

SUMMARY OF THE INVENTION

ATM cell switching and transmission is an international standard for transmitting voice and data via high speed transmission systems such as fiber optic systems. In the present invention, 53 byte length ATM compliant cells are transmitted over a digital optical fiber path to interconnect with a conventional coaxial feeder cable TV system to support two-way digital services at a plurality of houses or businesses connected to the TV cable system. At the point of interconnection between the fiber optic path and the cable TV feeder subsystem, digital signals are converted to a UHF rf carrier frequency above the cutoff pass-band of the analog signal feeder amplifier carrying TV broadcast signals. This rf carrier conveys a high data rate digitally modulated signal limited to a section, or sections, of feeder cable between the cable TV broadcast channel amplifiers. In-house access to this UHF carrier signal is via the normal TV cable tap and drop cable to a SIU, located near the subscriber's TV set. The feeder cable and the passive taps used in cable TV practice have a higher cutoff frequency than the feeder amplifiers themselves. This thus allows passage of an UHF signal over the feeder cable. Low pass filters at the feeder amplifiers prevent this UHF signal from being shorted out by the in-cable amplifiers. Thus, one unique feature of this invention is the use of frequencies above the range of the feeder or extender amplifier, not otherwise available for any purpose. Only those houses connected to the cable desiring high speed digital service require an SIU. Each SIU so connected sends and receives the UHF carrier signal, which conveys the ATM type cells. In this invention, each cell's payload contains the local address of the source and destination of that cell. Each SIU decodes each cell's address and accepts only those cells that are for itself. These locally addressed cells may, for example, contain digital voice telephone segments or data signals. The SIUs speak to and receive signals from a master unit called a Fiber Terminating Unit (FTU) located at the TV cable headend or at a fiber connection node. The common channel conveying the ATM cells alternatively sends and receives cells in a ping-pong fashion. An objective of this invention is to support two-way services and overcome the past limitations of propagation delays at very high data rates over long distance circuits by a unique capacity assignment and polling arrangement from the FTU to support high data rate fast packet cells.

BRIEF DESCRIPTION OF THE FIGURES

FIG. 4 is a block diagram of an all fiber version of the present invention, not requiring a cable TV system.

DESCRIPTION OF THE PREFERRED EMBODIMENTS

Figure 1:
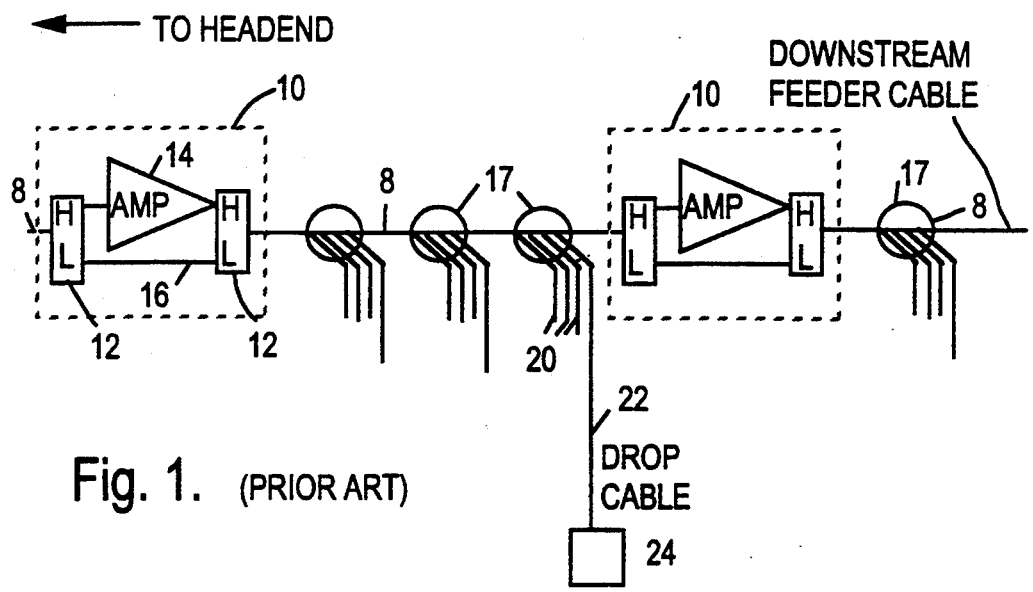
FIG. 1 is a block diagram of a conventional cable TV system of the prior art that uses multiple extender amplifiers.

The prior art FTU can send out cells without concern about interfering with any other device, however, constraints occur in the return signal direction. The present invention overcomes these limitations by having the FTU poll in an unique manner in which the FTU's polling logic initially assumes and reserves an arbitrary capacity, i.e., number of cells expected to be transmitted from each SIU. Without guidance, each SIU lacks information when and how many cells it can send in one burst without the danger of stepping on an adjacent SIU's transmission. With measured experience, the allocation can be dynamically changed to converge to match the applied load rates.

A voice packet is assumed to use 192 bits out of the 384 bits of the ATM cell to carry voice. The remainder of the cell is available for control information. 192 bits×333.333 samples per second is needed to support a 64,000 b/s voice channel. 333.333 samples per second is 0.003 seconds per sample. Thus, polling is scheduled to occur so that each SIU is polled at least once in a 3 milliseconds period.

If the fiber data rate is 155 Mb/s, then the transmit time for each 424 bit (53 bytes) ATM cell is 2.735 microseconds. In this sample case, there will be about (1097−1)/2=548 cells between each SIU polling interval to be shared among all the SIUs.

The FTU constantly updates the maximum number of cells each SIU is authorized to transmit in the following manner. Each SIU may or may not use its full allocation. Generally, an SIU will not have as much traffic to send as its channel is authorized. When the FTU notes that a SIU does not use its full allocation of reserved cell spaces in which it may transmit, this excess capacity is reassigned to subsequently polled SIUs with more traffic that are closer to pressing their allocation limits. This sequential reassignment of the number of allowable cells that may be sent sequentially per SIU is based on the last polling cycle's history. The process converges rapidly to balance the traffic load from each SIU in a load optimal fashion, without incurring any overhead operational delays. The command authorizing the number of sequential cells that each SIU may transmit is contained within the first cell of the series of downstream cells sent to each SIU from the FTU.

This arrangement creates a powerful dynamic channel capacity control. For example, each SIU will transmit cells whose peak data rate is on the order of 2 Mb/s relative to a fiber rate of perhaps 155 Mb/s. Thus, the peak load of each SIU is only about 1/77th the capacity of the fiber rate, and, in practice, the average SIU rate would be even lower, most of the time. Further, each SIU might only take about 1/500th of the total capacity, but, whenever a burst demand is needed, the channel capacity is rapidly reassigned. This allows any single SIU to capture as much of the system capacity as needed to accommodate that heavy instantaneous load. If the load cannot be accommodated at that point in time, priority is given to voice cells since they are delay intolerant, while data normally can be delayed slightly without difficulty.

FIG. 1 illustrates a conventional two-way cable TV distribution system of the prior art for building cable TV systems. This system's amplifier/filter assemblies 10 are at selected intervals along feeder cable 8. Each amplifier/filter 10 includes a pair of diplex filters 12 which serve to create two separate paths: the primary path is for downstream video signals, which for example, might occupy the 50 to 450 MHz signal range; and the second path is to accommodate the 5-30 MHz range signals in the reverse direction, or up-stream, transmission. Between the two filters 12 in the downstream direction there is an amplifier 14, and in the up-stream direction there is only a signal path 16.

Starting from the left, a feeder cable 8 delivers downstream broadcast signals from the cable TV headend (not shown) to the first diplex filter 12 which directs that downstream signal to amplifier 14. Amplifier 14 is needed to amplify the downstream signal sufficiently to prevent that signal from being lost in noise as a result of the losses that the signal will experience as it proceeds downstream, namely due to transmission line, and tap-off load losses. No amplification is provided for the up-stream signals between filters 12 since the attenuation in the up-stream 5-30 MHz signal range is low because of the lower transmission line losses since there are no tap-off load losses. Diplex filters 12 thus permit the up-stream signals to bypass amplifier 14.

Amplifier 14 and filters 12 are generally mounted within a single amplifier housing 10 with the output of one amplifier 14 feeding one or more downstream feeder cables 8, with each feeder cable 8 serving a number of taps 17 disposed along the length of the downstream feeder cable 8. Each tap 17, generally, has about four ports 20, more or less, to which drop cables 22 are attached that reach television sets 24. To extend the coverage and reach of the prior art cable TV systems, several amplifier/filters 10 can also be operated in tandem.

Figure 2:
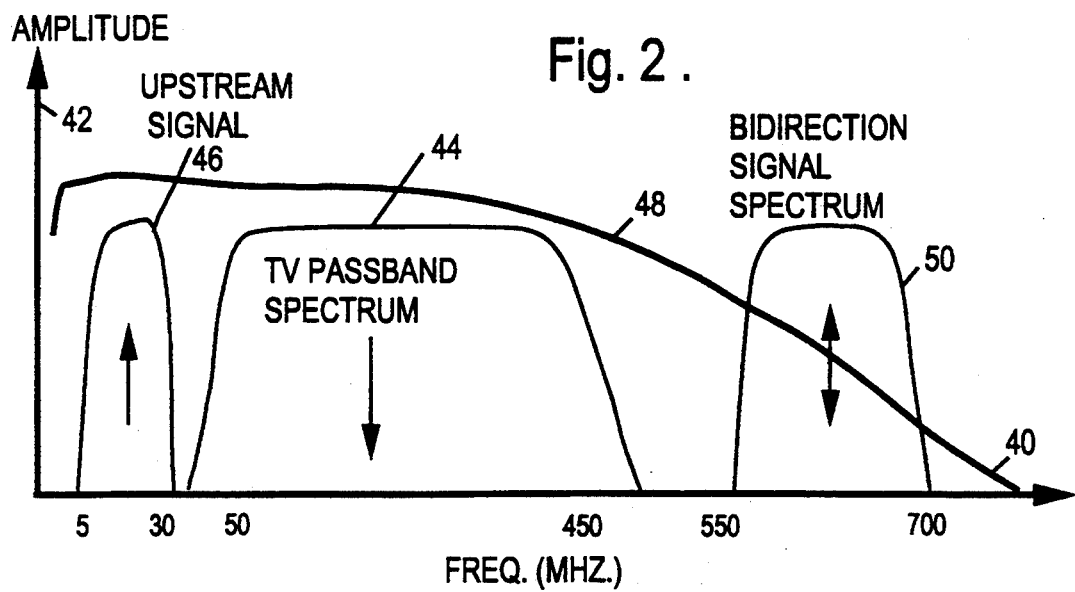
FIG. 2 is a graphical representation of the pass bands of the TV downstream amplifier, the frequency filter for 5-30 MHz operation of the prior art and the pass band used in the present invention.

FIG. 2 is a frequency versus amplitude plot of a set of curves noting the spectrum usage in cable TV systems, including the band utilized by the present invention. The horizontal axis 40 represents frequency, while the vertical axis 42 represents relative signal strength. TV broadcast signals are conveyed in the approximate band of 50 to 450 MHz (spectrum 44), while the prior art up-stream bandwidth occupies a 5 to 30 MHz (spectrum 46). The overall transmission passband between the feeder cable input and the end of the drop cable 22 is also shown as spectrum 48. Note that the attenuation of spectrum 48 is seen as a result of the losses of the conventional directive coupler taps 17 plus cable losses in feeder cables 8 and drop cables 22.

In the present invention, a bi-directional signal spectrum 50 located in the spectrum space above the TV passband spectrum 44 and below the upper end of the overall system spectrum attenuation curve 48 is used for up-stream communications instead of the 5–30 MHz band of the prior art.

Figure 3:
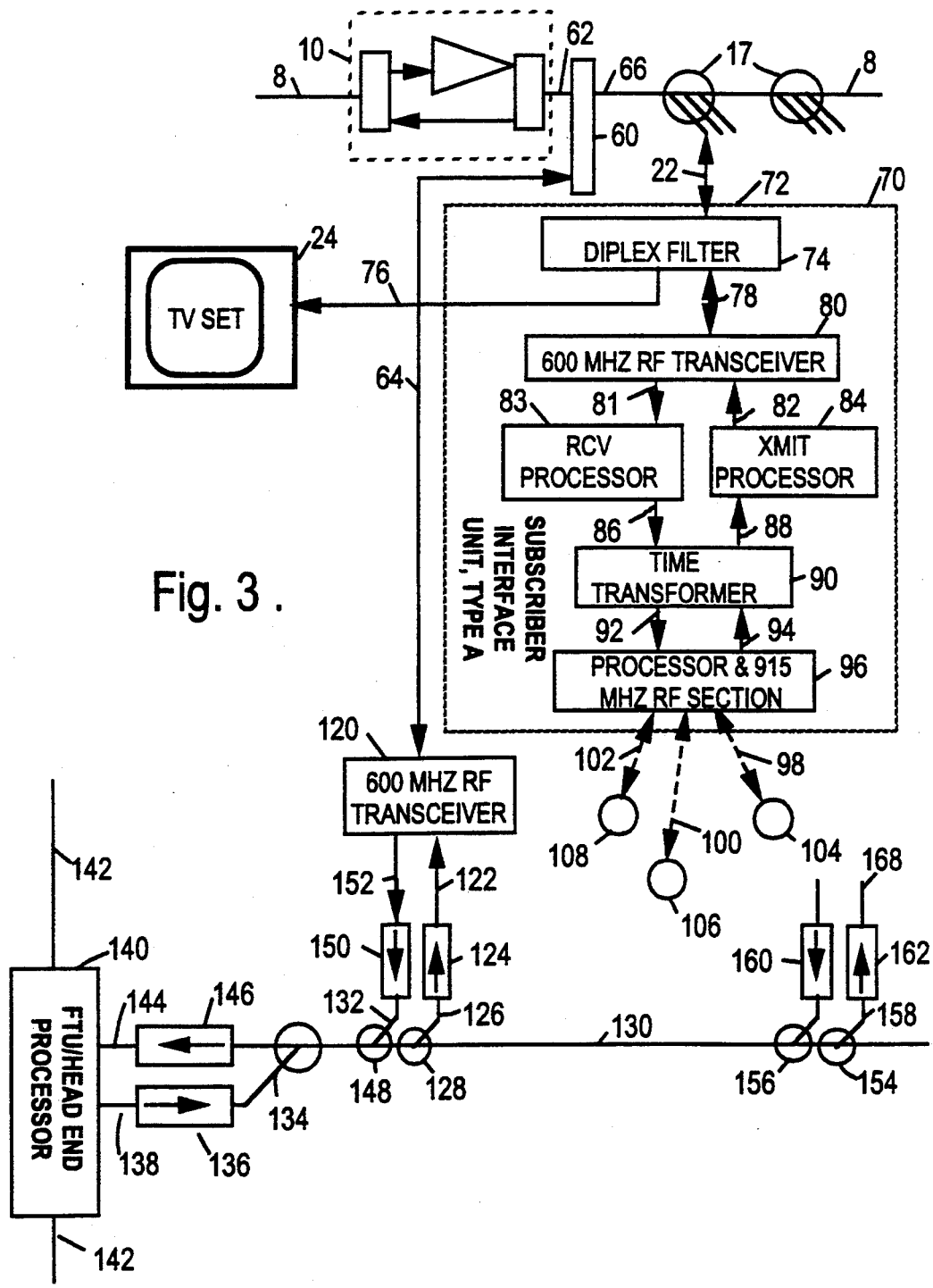
FIG. 3 is a block diagram of a cable TV system incorporating the present invention.

FIG. 3 illustrates the necessary modifications to the conventional cable TV system together with new elements used in the implementation of the present invention to utilize the 550–700 MHz band for bi-directional communication and data transmission. At the top of FIG. 3 there is shown the basic structure of the conventional cable TV system as shown in FIG. 1, with the addition of another filtering device 60 added between the downstream junction point of an amplifier 10 and downstream feeder cable 8. Also at the bottom of FIG. 3 is shown an optical fiber network for use with the present invention as discussed below. With the inclusion of filter 60 in the existing cable systems the prior art functions performed in the 5–30 MHz and TV signal bands will not be effected, however, the use of the bi-directional communication and data transmission in the 550–700 MHz band, as per the present invention, will be possible.

As shown in FIG. 3, filter 60 has an up-stream connection 62 with the downstream end of amplifier 10, a downstream connection 66 with downstream feeder cable 8, plus an upstream high frequency connection 64. The signals in the 5–30 MHz and TV bands are provided to feeder cable 8 from amplifier 10 and the communications signals from the 550–700 MHz band via high frequency connection 64 and the fiber optic system shown at the bottom of FIG. 3 and described below.

Filter 60 includes two sections, a low pass section for passing the 5–30 MHz and TV signals from filter assembly 10 to feeder cable 8 and a high pass section to couple the 550–700 MHz signals to/from the optical fiber network shown at the bottom of FIG. 3 (described more completely below) to feeder cable 8.

Connected to drop cable 22 is an SIU Type A 70 that serves as the connection access point to relay signals to hand held cordless transceivers 104, 106 and 108. The operation of a cordless transceiver of this type, and the processor and 915 MHz rf section interface unit 96 are described in U.S. Patent Application entitled "CELL BASED WIDE AREA NETWORK ALTERNATIVE ACCESS TELEPHONE AND DATA SYSTEM" having Ser. No. 07/953,744, filed on Sep. 29, 1992, by the same inventor as the present application. It is also described in a technical paper scheduled for presentation at the Society of Cable TV Congress Meeting on Jan. 7, 1993 in New Orleans.

In FIG. 3, the connection between the extended cable system and SIU 70 is shown via drop cable 22 which terminates at port 72 of diplex filter 74. Filter 74 is provided to separate the relatively lower frequency downstream signals provided by amplifier 10 from the bi-directional signals in the 550–700 MHz band utilized by the present invention for two way communication of voice and data signals. Filter 74 has three ports, 72, 76 and 78: full-frequency port 72, low pass output port 76, and high frequency communications port 78. The connection of port 72 is described above, low frequency port 76 is shown connected to TV set 24, and high frequency port 78 is connected to rf transceiver 80. In this application a conventional passive LC filter is commonly used as they are in the Cable TV art.

Rf transceiver 80 is shown operating at a frequency that is above the normal TV frequency band as was shown in FIG. 2 (for example 600 MHz) to send and receive the desired signals in the high frequency band of interest. Transceiver 80 is a 600 MHz radio receiver and a 600 MHz radio transmitter operating in a half-duplex, or ping-pong, mode in which a cell packet is received and then the receiver is turned off when the transmitter section is turned on i.e. multiplexing the receiver/send signals. Details of a transceiver of this type are provided below with relation to FIG. 9.

Figure 8:
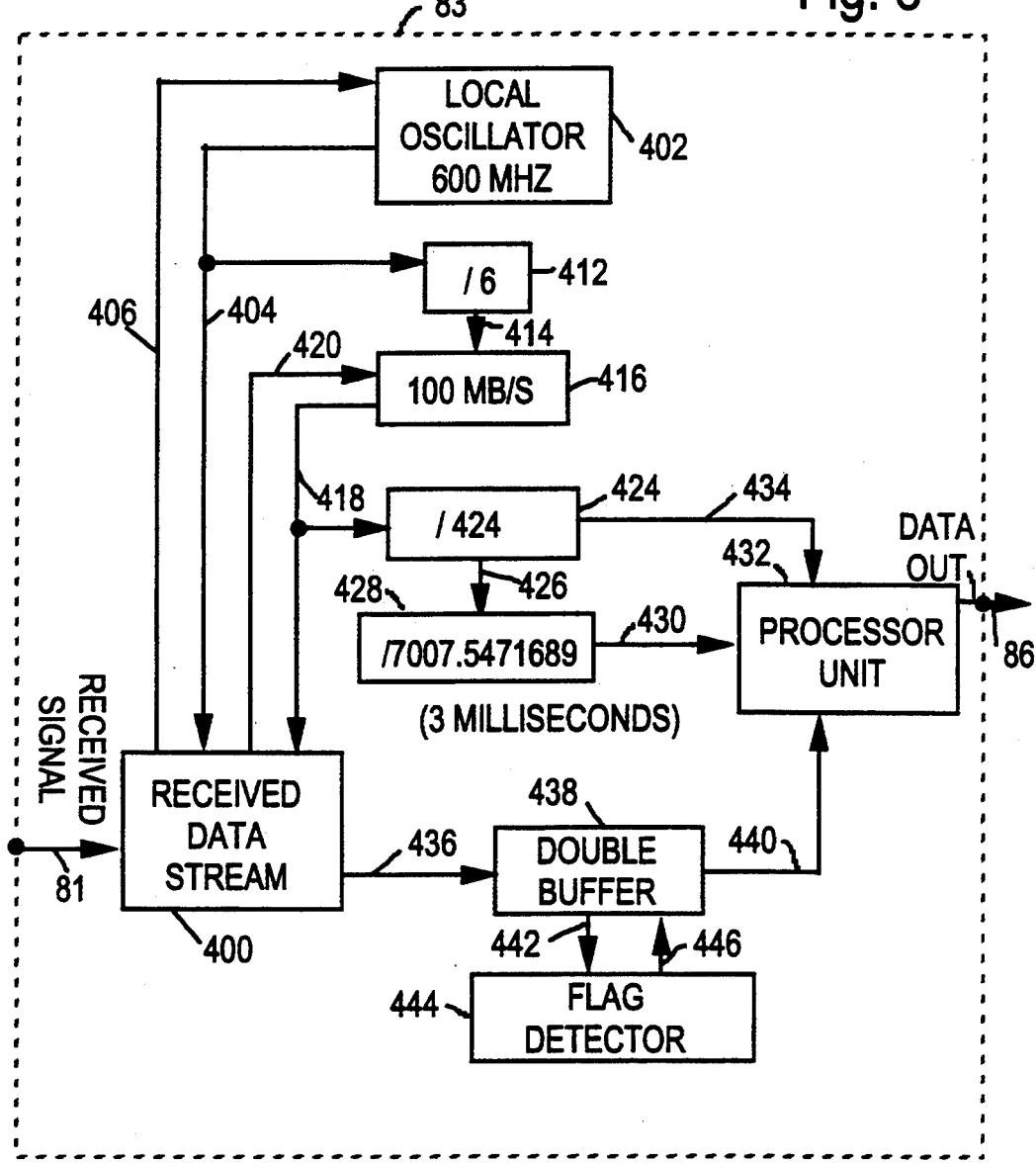
FIG. 8 is a flow chart of the synchronization used between the FTU and the SIUs used to provide isochronous operation.

Transceiver 80 delivers the incoming, or downstream, high frequency signals, via port 81, to receive processor 83. Receive processor 83 is shown in detail in FIG. 8 and is discussed below when FIG. 8 is discussed. Similarly, transceiver 80 receives the outgoing, or up-stream, high frequency signals via port 82 from transmit processor 84 which is a buffer to hold the cell packets for transmission until transceiver 80 is available to transfer those cell packets up-stream. The next block shown in FIG. 3 is time transformer 90 which receives an input signal via port 86 from receive processor 83 and applies an output signal via port 88 to transmit processor 84. In each, operation time transformer 90 performs a similar operation, only in the reverse direction.

The "time transformation" preformed by time transformer 90 is the modification of the clock rate of an input packet cell without modification of the data, signal, or format. In the present application the receive processor 83 and the transmit processor 84 might operate at 100 Mb/s while the output/input signals 92 and 94 of time transformer 90 might be operating at about 2 Mb/s. The term "time transformer" refers to the data processing practice of receiving a packet at one data rate, buffering the packet and thence retransmitting it at a higher data rate.

Then, following time transformer 90, connected to it in both the up- and down- stream directions, there is shown a processor and rf section 96. In an application such as that discussed here, processor and rf section 96 generally operates in a UHF band, most likely around 915 MHz. Rf section 96 provides for bi-directional transmission and reception of cells, conveying information at a data rate of about 2-Mb/s and using a carrier frequency of about 915 MHz, to/from wireless telephones or data transceivers 104, 106 and 108 via radio paths 98, 100 and 102, respectively. This arrangement is similar to that described in co-pending U.S. Patent Application entitled "CELL BASED WIDE AREA NETWORK ALTERNATIVE ACCESS TELEPHONE AND DATA SYSTEM" having Ser. No. 07/953,744, filed on Sep. 29, 1992, by the same applicant.

Referring back to high frequency connection 64 of filter 60 mentioned above, and the lower portion of FIG. 3, there is shown a second 600 MHz rf transceiver 120 (similar to transceiver 80) to interface the high frequency voice and data signals transmitted in the optical network to SIU 70. The high frequency signals in the 550–700 MHz range sent and received from/to the FTU/Headend Processor 140 are sent, at 100 Mb/s in this example, via RF transceiver 120 and diplex filter 60 via a connection responsive only to frequencies above the normal TV band.

Transceiver 120 has an input, or downstream, port 122 and an output, or up-stream, port 152. The downstream signal at port 122 is provided by an optical light to electrical converter 124, which receives its optical signal from tap 126 of directional optical coupler 128. Similarly, the up-stream signal at port 152 is applied to an electrical signal to optical light converter 150, which delivers the converted optical signal to tap 132 of directional optical coupler 148. Each of directional optical couplers 128 and 148 are connected to fiber optic cable 130 which simultaneously carries both up- and downstream signals. The downstream signals from headend processor 140 are applied to fiber optic cable 130 via directional coupler 134 from an electrical to optical converter 136. The up-stream signals similarly are converted in optical to electrical signal converter 146 and then delivered to headend processor 140.

The location of fiber optic cable 130 and related components are located in the same bundle of cables 8 used to transmit the TV signals. It is only an incremental increase in the cost of the cable to add an additional fiber to it.

Additional Subscriber Interface Units can be accommodated by this system via fiber optic cable 130, through directional couplers 154 and 156, via electrical to optical and optical to electrical converters 160 and 162 and additional downstream equipment of the type described above.

Typically, headend processor 140 would be located at the cable TV headend, or lower down the cable tree. At the point of headend processor 140 connections are made to other communication networks which could include local and long distance telephone companies, satellite communication links, other cable TV systems, etc. (not shown). These interconnections are accomplished via ATM links 142. In this example the long distance connection is via a passive optical network (PON), however, other architectures could be used and the necessary changes would be known to one familiar with the art. The details of the operation of headend processor 140 is discussed below by means of the flowchart of FIG. 6 and the related discussion.

FIG. 4 is a block diagram of an all fiber version of the present invention, not requiring a cable TV system. In the embodiment of FIG. 4 the connection to optical cable 130 is similar to that of the arrangement in the embodiment of FIG. 3. One major difference between the two embodiments is that in the FIG. 4 embodiment the cable TV system is not used as a transmission path. Instead, the optical fiber digital signals at ports 122 and 152 of optical-to-electrical or electrical-to-optical converters 124 and 150, respectively, are connected by short distance twisted pair wiring, or a coaxial cable, to resynch and command transmitter 99 of SIU 180. In operation, unit 99 performs the same functions as receive and transmit processors 83 and 84, respectively, in combination with an optical to electrical to optical converter. In other words, the 600 MHz transceiver 80 of FIG. 3 has been replaced with a fiber optic path and the balance of the SIU is unchanged. Since rf modulation and demodulation are not required, a simplified Subscriber Interface Unit ("Type B") 180 can be used. This arrangement simply removes the diplex filter 74 and the 600 MHz rf transceivers 80 and 120 required in the embodiment of FIG. 3.

Further, an optional interface 182 is shown from processor and rf section 96 to illustrate the interfacing of SIU 180 to other devices operating at different data rates that can be accommodated. For example, as illustrated here interface 182 is connected to an Ethernet unit 184 to connect SIU 180 to a local area network (LAN) 188. Through the use of an extended time transformer 90 other devices can also be connected to SIU 180. The chief limitation is that the maximum total throughput must be less than the total system capacity. One advantage of this arrangement is that it can extend the usefulness of Ethernet, and other LAN technologies, that have a limited allowable path length. By coupling such a system to this embodiment of the present invention, the present invention's method of dynamic load assignment overcomes such limitations. This would allow the use of common standard LANs to be connected together in wide area network arrangements (WANs) without the distance limitations previously described.

Figure 5A:
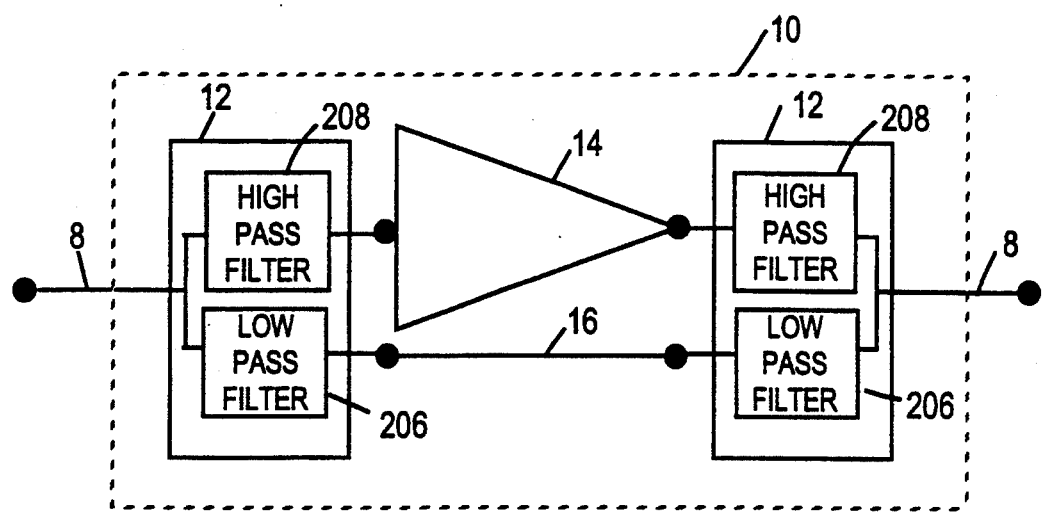
FIG. 5a is a block diagram showing the prior art plug-in filter arrangement activated for two-way cable TV system use.

Referring next to FIG. 5a there is shown the details of the prior art amplifier assembly 10 of FIG. 1. At both the up-stream and downstream ends are diplex filter sections 12 that each include a low pass filter section 206 that passes frequencies under 30 MHz and a high pass filter section 208 that passes frequencies greater than 50 MHz. Connected between each of the high pass sections 208 in the downstream direction is a unidirectional amplifier 14. Each of the low pass filter sections are connected to each other in the bi-directional low frequency path. Additionally, the filters 12 can be modular plug-in units used only when bi-directional operation is required. When amplification is required in the 5–30 MHz upstream path, an upstream amplifier (not shown) can also be used in lieu of the wire connection 16 shown.

Figure 5B:
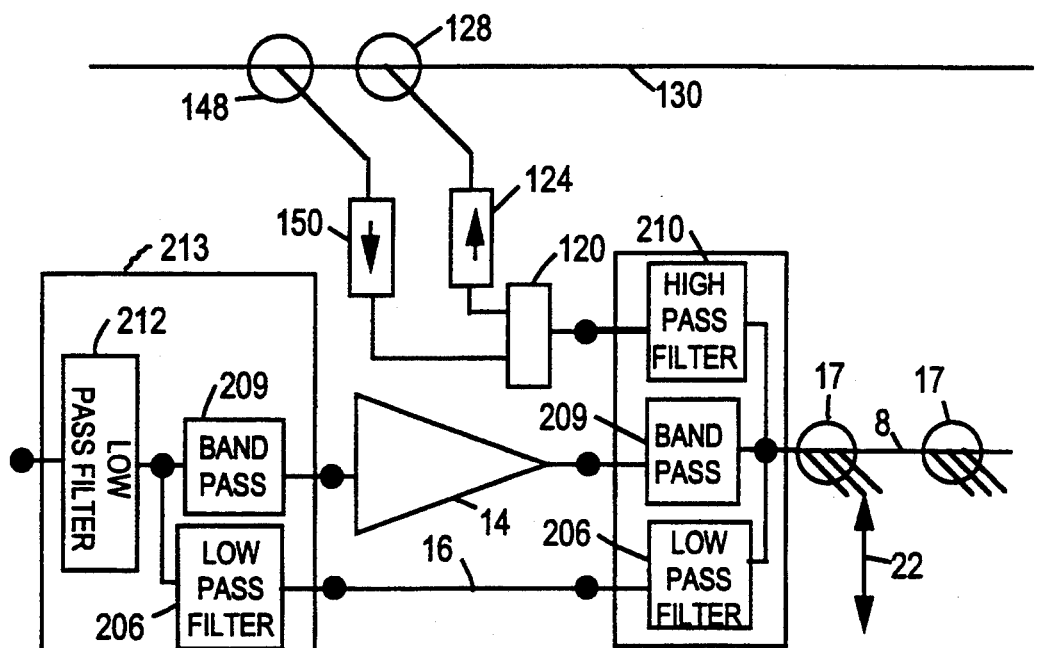
FIG. 5b is a block diagram showing the modification to the filter arrangement of the prior art and insertion point of optical signals at the feeder amplifier.

FIG. 5b illustrates an alternative to the individual amplifier assembly 10 and diplex filter 60 of FIG. 3. As in the prior art applications as shown in FIG. 1, this modified amplifier/filter assembly will still be repeated at selected intervals along TV feeder cable 8. Thus, it is possible to introduce different high frequency communication and data signals on each section of feeder cable 8 which will become clearer as the substitute amplifier/feeder section of FIG. 5b is discussed below. In this embodiment, the functions of amplifier 10 and diplex filter 60 are combined into a single assembly. Shown in FIG. 5b are the following unchanged items from FIG. 3: amplifier 14; connection 16; rf transceiver 120; electrical-to-optical and optical-to-electrical converters 124 and 150; fiber optic cable 130 and optical directional couplers 128 and 148; and TV feeder cable 8 and directional couplers 17. The up-stream diplex filter section 12 (left side) of FIG. 3 has been replaced by two stage filter section 213, and the combination of downstream diplex filter section 12 (right side) and diplex filter 60 of FIG. 3 has been replaced by triplex filter 215.

Triplex filter section 215 includes three filter sections: low pass filter 206 which is the same as in FIG. 5a to pass only those frequencies below 45 MHz; bandpass filter 209 which passes signals in the 50-450 MHz range and substantially performs the function of high pass filter 208 of FIG. 5a; and high pass filter section 210 which passes signals having frequencies that are greater than 550 MHz and which corresponds to the high pass filter section of diplex filter 60 in FIG. 3. As can be seen in FIG. 5b, the high frequency communication and data signals carried on optical fiber cable 130 are introduced to the selected section of feeder cable 8 through high passes filter 210 of filter 215 which is downstream from the desired subscriber of the TV cable service. The TV band signals are provided to the same section of feeder cable 8 via band pass filter 209, and the bidirectional low frequency signals are coupled to and from the same section of feeder cable 8 via low pass filter 206, as previously done in the prior art.

Filter assembly 213 is a two stage filter with three filter elements; a low pass filter section 212 that only passes signals of 450 MHz or less; a band pass filter 209 with the same characteristics as described above; and a low pass filter 206 also with the same characteristics as described above. Band pass filter 209 and low pass filter 206 are arranged in filter assembly 213 as a diplex filter on the downstream side of filter 213. On the up-stream side of filter assembly 213 is low pass filter section 212 which provides the downstream input signals to both band pass filter 209 and low pass filter 206 of this assembly. Thus low pass filter section 212 blocks the 550-700 MHz signals from flowing up-stream from the section of feeder cable 8 where that signal is introduced by high pass filter 210. Also, low pass filter section 212 of filter assembly 213 of the next amplifier assembly downstream blocks those signals from migrating further downstream (see FIG. 1, note that amplifier sections 10 are repeated along feeder cable 8 at selected intervals).

Figure 6:
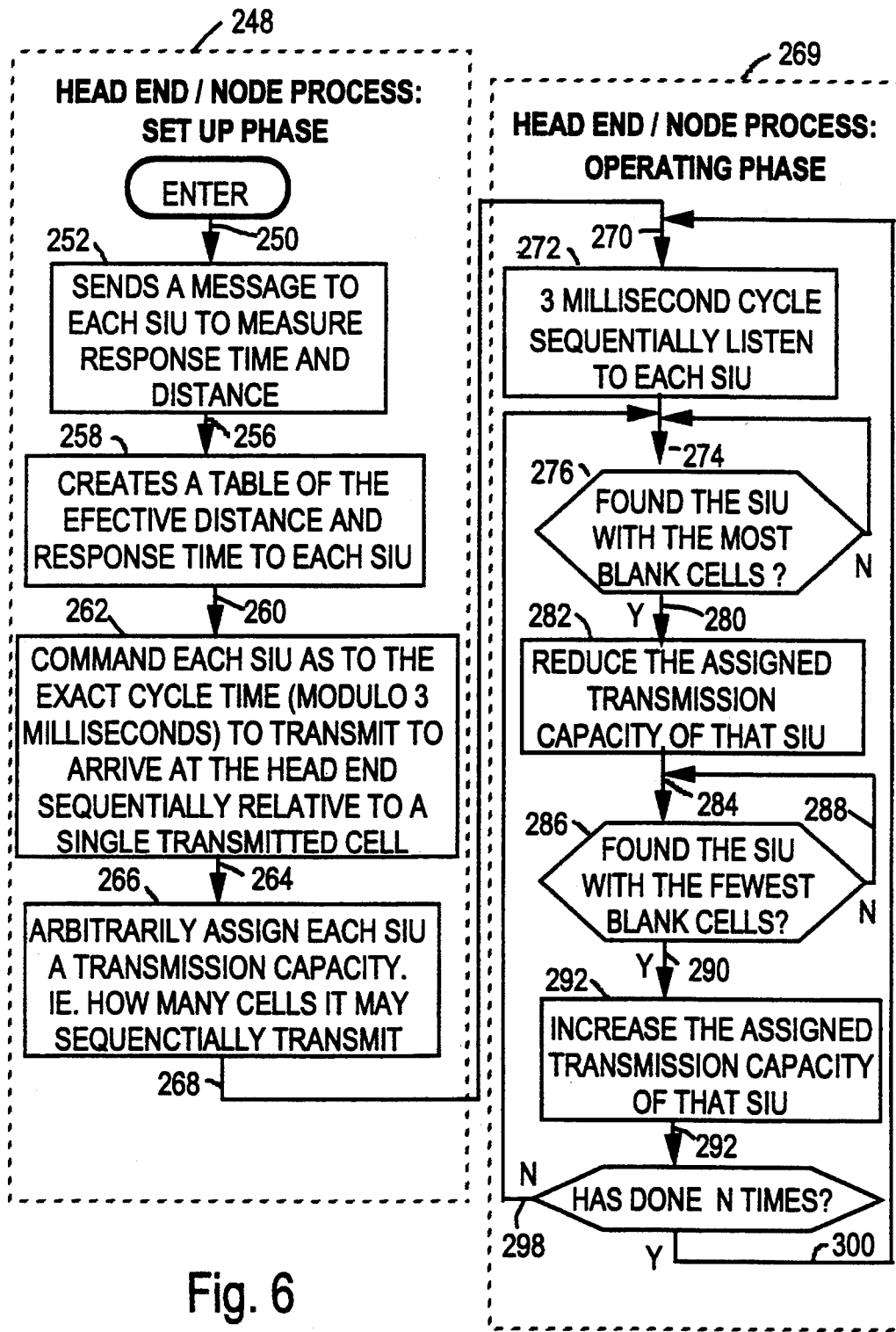
FIG. 6 is a flow chart of the polling algorithm as used in the present invention.

FIG. 6 presents a flow chart that illustrates the polling process performed in FTU/Headend Processor 140. Polling is done to allow for the sharing of a common channel among a number of users in an efficient manner. The polling program is divided into two sections, a Set Up Phase 248 and an Operating Phase 269.

The initializing point for the Set Up Phase routine is labeled "Enter" 250 from which routine 252 to measures the response time and distance from the head end to each of the SIUs is initiated. Upon completion of routine 252, the next routine, Create Delay Time Table 258 routine is initiated to establish a table of the effective distance and round trip response times needed to reach each SIU. Upon completion of that table, routine 262 commands each SIU as to the exact cycle time (modulo 3 milliseconds) for transmissions to arrive at the head end sequentially relative to a single transmitted cell packet. In other words, this subroutine sends each SIU the required time offset that must be observed so that particular SIU sends its cells so that they arrive at a time anticipated by Fiber Terminator Unit/Headend Processor 140. The next routine 266, Preliminary Capacity Assignment, is initiated to arbitrarily assign to each SIU an initial transmission capacity (i.e. the number of cells that it is permitted to transmit at one time). That is each SIU is temporarily assigned the maximum number of contiguous cells that it may send when polled. As will be seen below, this is a short term temporary decision which changes every 3 milliseconds, when traffic measurements of the last cycle become available. As a starting point, each SIU is assigned the total available capacity divided by number of SIUs sharing the common capacity. Upon completion of this routine, the Set-Up Phase 248 is complete and the Operating Phase 269 is initiated.

In the Operating Phase 269, the first routine 272 is a 3 millisecond cycle that is a control program to insure that every SIU is polled within a 3 millisecond maximum polling interval. An SIU may be polled as often as feasible but never less often than every 3 milliseconds. This maximum period constraint insures that voice cells are transmitted without delays. Running concurrently with the 3 millisecond cycle routine 272 is a routine of several steps to determine the unused capacity among the various SIUs. This routine modifies the previously assigned allowed output capacity for each SIU after finding those SIUs with the most unused capacity assigned for transmission cells by cycling through each SIU until all of the SIUs have been addressed. This is performed by first (step 276) determining which of the SIUs has the most blank cell packets and then reducing the assigned transmission capacity of that SIU (step 282). Once that has been done the SIU with the fewest blank cell packets is identified (step 286) followed by the increasing so the assigned capacity of the SIU identified in step 286 (step 292). Steps 276 through 292 are then repeated until all N SIUs have been addressed. This routine thus books capacity away from those SIUs not needing some or all of their previously assigned capacity to those SIUs that are closest to matching the actual use of their previous allocation. This routine thus adds the information to downstream cells from the headend to inform each SIU of its new assigned capacity. Following completion of that routine control is returned to routine 272 when the 3 millisecond period is completed.

Figure 7:
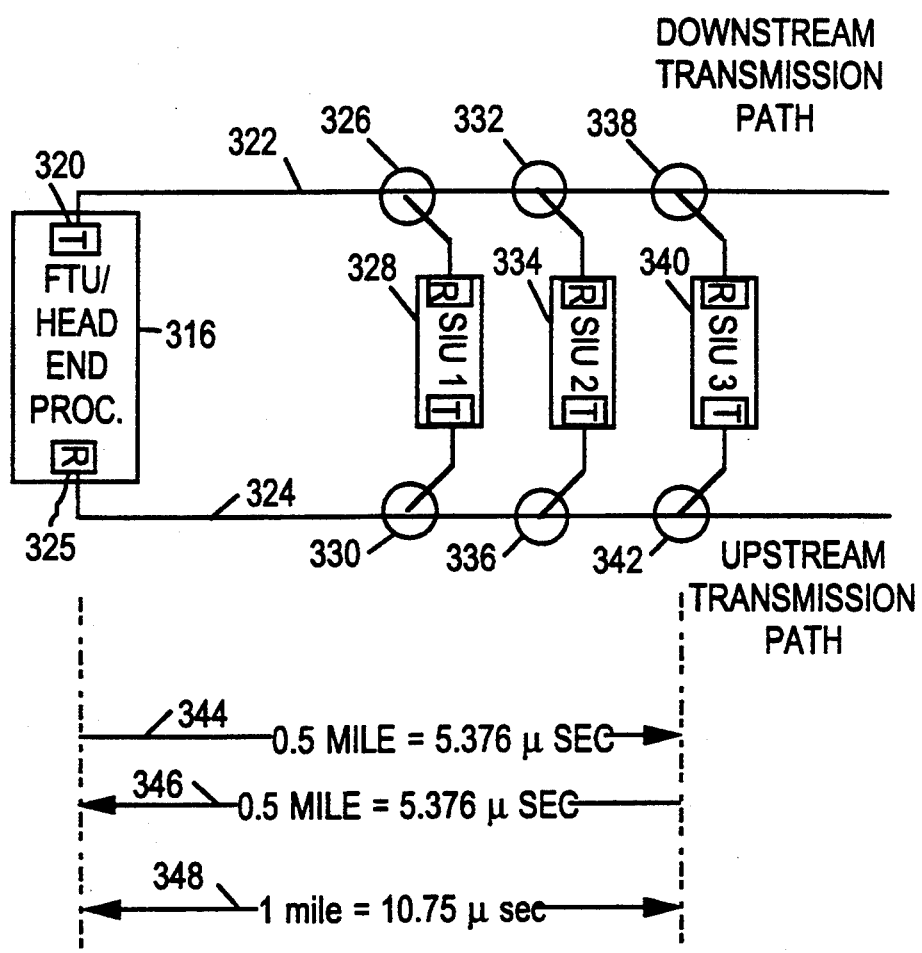
FIG. 7 is a flow/timing diagram of the cell arrival time restrictions including the effect of transmission times.

FIG. 7 is a simplified illustration of the flow/timing of the cell arrival time restrictions including the effect of transmission times. In FIG. 3 the transmission to and from the SIUs is via a single cable 8 in a bidirectional manner. For purposes of illustration in FIG. 7 that single bidirectional communication path 8 has been replaced by individual unidirectional transmission paths 322 and 324 from/to the FTU/Headend Processor 316 with a plurality of SIUs 328, 334 and 340 each interconnected between those two paths. Additionally, FTU 316 includes a transmitter 320 and a receiver 325. The downstream transmission path 322 conveys cells from transmitter 320 of FTU 316 to each of the SIUs where the signals are then lifted off transmission path 322 by the receiver section of each of SIUs 328, 334 and 340 via directional couplers, 326, 332, and 338, respectively. The output signal from the transmitter section of each of SIUs 328, 334 and 340 are then fed to directional couplers 330, 336 and 342, respectively, for delivery to the return path 324 and receiver 325 of FTU 316. For purposes of illustration the path of FIG. 7 is selected to be a 0.5 mile path which is equivalent to a 5.376 microsecond delay, based on the speed of light, and, thus, a round trip time for such a path length is about 10.75 microseconds. Therefore, a 424 bit cell at 100 megabits per second requires 4.24 microseconds for transmission over such a path length. Given that, in this example the transit time is significantly longer than the time to transmit the cell so the importance of the scheduling algorithm described above is necessary to cope with these distances.

In FIG. 7, and in other figures, although only a single SIU is shown connected to each directional coupler, in practice there are multiple taps on such couplers and many SIUs will be connected to each. Further, transmission from FTU 316 is in sequential cells with dummy cells being sent if there is no information to be sent. This is done to keep the channel busy to authorize each SIU to transmit when ready and to keep the allocation of the number of cells that SIU may transmit current. Since the FTU transmitted cells are transmitted one following another, each of the SIUs receives a continuous stream of bits upon which to synchronize the received timing reference shown in FIG. 8.

Timing for control of the SIUs uses the bit timing of the constant bit stream of the cells emanating from FTU 316 with each SIU locking a local oscillator to this bit rate to control the timing of the output cells of the SIU. This same timing source also provides the frequency reference for the receive section of each SIU. Thus the FTU and the SIUs are essentially locked together with known measured transit time offsets.

FIG. 8 is a detailed block diagram of receive processor 83 of the SIU shown in FIG. 3. In this figure the downstream signal 81, the received signal, enters receive data stream block 400 which is discussed more completely below. A local oscillator 402 which operates at 600 MHz is included with the 600 MHz frequency having been selected since it is the center frequency of the high frequency band of interest since this system uses a homodyne receiver/transmitter which has a zero frequency IF. Thus the received signal and the local oscillator frequency are the same and it is important that the two signals be tuned to each other. Thus local oscillator 402 generates signal 404 which is hytrodyned with the received signal in block 400 with a mismatched signal 406 being supplied to local oscillator 402 for control of the frequency of local oscillator 402 to roughly lock the two signals together in frequency. The output signal from local oscillator 402 is also applied to divider 412 where the frequency of the 6 MHz signal is divided by 6 to produce a 100 MB/s signal. That 100 MB/s signal is then applied to block 400 to lock with the data rate of the incoming data stream of the received signal 81. Again a mismatch signal is generated in block 400 with a signal representative of the mismatch being applied to the 100 MB/s clock 416 to synchronize the phases of the data rates. The resulting corrected data rate clock signal 418 is then applied to divider 424 where the 100 MB/s data rate is divided by 424 to produce a 3 millisecond clock at block 428. As discussed above, the need for a 3 millisecond clock is for a polling clock so as not to loose any voice samples during operation of the overall system. The signal 436 from block 400, a reclocked version of the received data signal 81, is applied to double buffer 438 which is reading in one cell packet at the same time that the previous cell packet is being read out by processor 432. To detect the frame, a flag detector 444 is provided to detect packet flags to align all of the bits of a single cell packet in one buffer of double buffer 438, i.e. flag detector 444 prevents cell packets from being broken up when temporarily stored in buffer 438. The resulting data out signal 86 is complete cell packets that are produced at regular intervals.

In FIG. 8, the timing reference is shown derived from the received frequency reference. Each SIU receiver receives its signals at the appropriate same level, only a minimal slow moving AGC control is needed. Each SIU listens for its own address and decodes only cells addressed to itself. The first cell of the sequence tells that particular SIU (1) the number of cells that are being sent, (2) the number of cells that SIU is authorized to send, at (3) time T. Time T is referenced relative to the module 3 ms timing source. This 3 ms clock is reset every 3 ms. Some of these cells are inbound information, but even if not, SIUs sending one or more voice channels would be guaranteed to be polled each 3 ms.

The SIU transmitters are long-term phase locked to the incoming signal. It is difficult to maintain the SIU's signal arrival times at the FTU, so short silence periods followed by a run-in-symbol is used to synchronize to each SIU's transmission.

Figure 9:
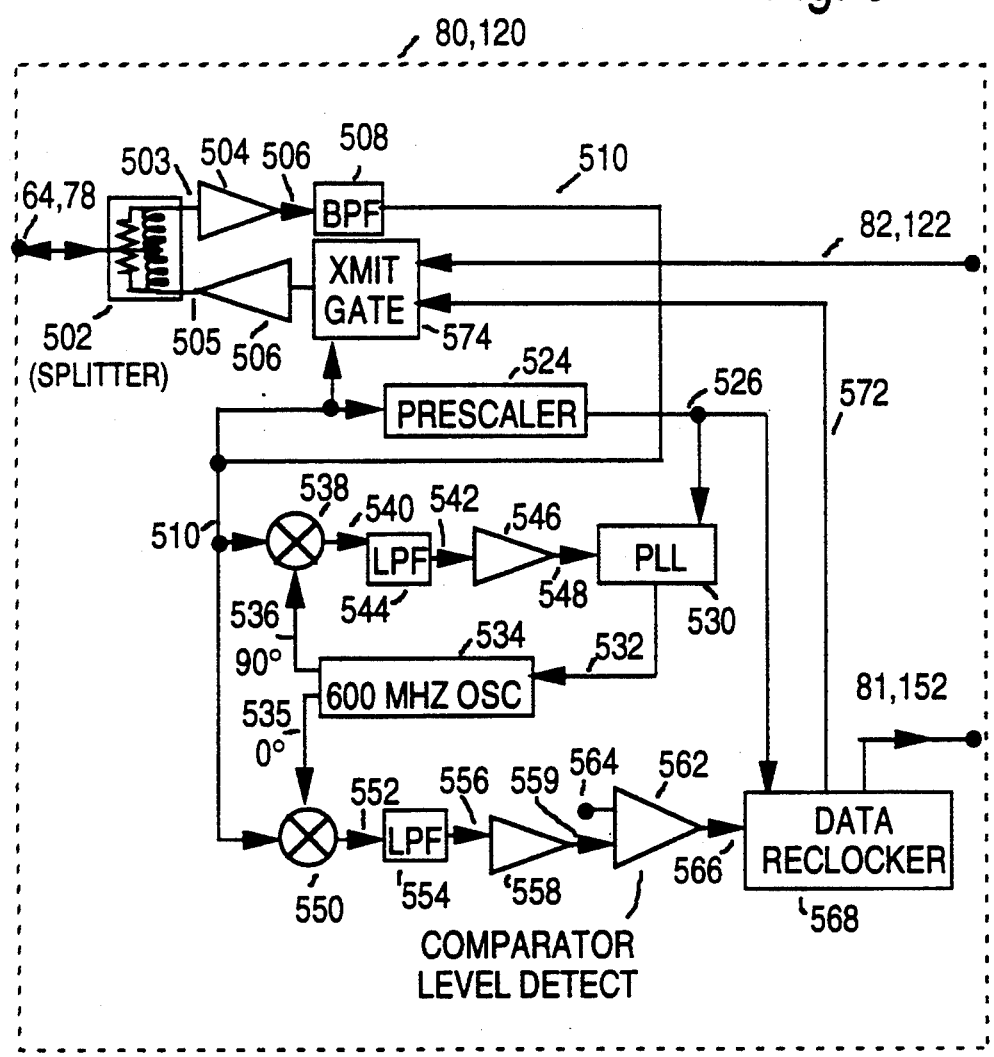
FIG. 9 is a block diagram of the transceiver as used in the SIUs.

FIG. 9 is a block diagram of the 600 MHz homodyne transceivers 80 and 120 used in FIG. 3 which is either a receiver or a transmitter that is under command control. In the receive mode, the incoming signal 64 or 78 is received by splitter 502, and in the transmit mode, signal 64 or 78 are transmit signals that emanate from splitter 502. In the receive mode the output signal is 81 or 152 from data reclocker 568, and in the transmit mode the input signal is 82 or 122 that is received by transmit gate 574.

For purposes of discussion, first assume that transceiver 80 or 120 is operating in the receive mode and has received an input data stream 64 or 78 at splitter 502. From splitter 502 the received signal is applied to amplifier 504 and then band pass filter 508 centered at 600 MHz. The output of filter 508 is then applied to mixers 538 and 550, prescaler 524 and transmit gate 574. Signal 510 initiates the blocking of transceiver 80 or 120 form assuming the transmit mode by blocking gate 574. Prescaler 524 counts down the signal with the result applied to phase lock loop (PLL) 530. The output signal of PLL 530 controls 600 MHz oscillator 534. Oscillator 534 has two output signals, one at 0° (535) and one at 90° (536). The 90° signal 536 from oscillator 534 is applied to mixer 538 with the resulting output of mixer 538 being applied to low pass filter 544 followed by amplifier 546 and then to PLL 530 to complete the loop that controls the frequency of oscillator 534 at 600 MHz.

The 0° phase signal from oscillator 534 is also hetrodyned with the input signal in mixer 550. The output of mixer 550 is then low pass filtered (554) and amplified (558). The resulting signal from amplifier 558 is then applied to comparator 562 for comparison with a positive voltage level applied to terminal 564 above which the signal is clipped. Signal 566 from comparator 562 is the clipped data signal that is applied to data reclocker 568 together with the signal 526 from prescaler 524 to reclock the data (568) and to produce output signal 81 or 152. Data reclocker 568 also generates an end of receive data signal which is applied to transmit gate 574 to switch transceiver 80 or 120 to the transmit mode.

In the transmit mode the signal to be transmitted (82 or 122) is applied to transmit gate 574, and if there is no signal being received gate 574 applies the signal to be transmitted to amplifier 506 and then splitter 502 to be outputed as signal 64 or 78.

Basic timing for the system is determined by a reference oscillator at the Master Station (FTU). This timing can be locked to a connection to a higher level source if desired. The basic timing reference establishes a common time base used to create the continually transmitted data stream from the FTU. The transmitting frequency of the master station is also derived from the reference time base to maintain a fixed phase relationship.

Each receiving Slave Station (SIUs) in turn derives its timing from the incoming data stream from the FTU. The SIU's local bit time and carrier frequency are both derived from the data stream received from the FTU. This signal is used to very slowly adjust the frequency of a local crystal oscillator.

When the Slave Station (SIU) is ready to transmit, it does so using this local crystal oscillator that will exhibit very little drift given the short time between receive and transmit.

The inexpensive transceiver in the SIU ideally will operate at a system selected data rate in the 45 to 155 Mb/s range. The actual frequency will be a function of the bandwidth available as the chosen carrier frequency is distributed over cable TV taps and drops and must avoid any interference to the normal TV signals on the same path.

The modulation bandwidth (assuming modulation in the 45 to 155 Mb/s range) will represent on the order of a 10 to 25% sideband width relative to the carrier's central frequency which is easily feasible. Although a multi-bit-per-Hertz modem could be used in this application, the high data rates required are at this time beyond the frequency range of inexpensive A/D converters available today for a low cost digital implementation of a more complex receiver. These economics are expected to change in the future. But, for the present, the incoming signal is assumed to be processed in analog form. For simplicity, a simple Differential Binary Shift Keying modulator and detector are used in the preferred embodiment.

The relatively fixed amplitude of the incoming signal and the low signal to noise ratio that is acceptable for BPSK modulation allows an inexpensive direct conversion or a homodyne receiver can be used wherein the same circuit can be rapidly converted from receiving to transmitting. There are a number of design caution areas for a homodyne or direct sequence receiver. (A) It is difficult to prevent oscillator leakage at UHF frequencies since the received frequency tuned circuit cannot be used to reject back feed oscillator signal; (B) The total amplifier serial gain or even the gain of a single amplifier that can be produced in any stage is limited before the amplifier chain is subject to oscillation. Therefore, care in isolation is required. On the other hand, there are ameliorating factors in this application. (A) The anticipated signal levels are high; (B) The noise floor is high, as the noise bandwidth is wide; (C) The receiver will be insensitive to noise less than about 15 dB relative to the desired signal so limited leakage is acceptable; (D) The mixture of cable and digital fiber in the preferred embodiment prevents building up or compounding the leakage signal. The digital electric to optic converter acts as a threshold device where only those signals over a pre-set threshold generates light signals. This reduces the magnitude of the cable TV problem of upstream noise buildup, as the number of subscribers increases.

It should be clear to one familiar with the art that two way transmission on fiber optic cable can be accomplished either by separate sending and receiving fibers or by a single fiber with multiplexing means, such as alternatively optical directional coupler or light frequency division multiplexing.

It should be further understood that SIUs can connect to users operating at data rates other than 2 Mb/s.

An SIU could operate for example at 10 Mb/s for a full Ethernet connection as well. The use of the ATM cell as a time transformer allows each end unit data rate to be independent of the data rate of other users.

In the claims the phrase "master polling station" refers to the Fiber Terminator Unit/Headend Processor, while the phrase "slave units" refer to the Subscriber Interface Units (SIUs).

While several embodiments and variations on them have been given above, the above discussion is intended to be illustrative and not the only ways that the desired result can be achieved. The present invention is only to be limited by the scope of the following claims.

What is claimed is:

1. A packet cell communications system having an implicit dynamic adaptive polling arrangement to provide fair resource allocation for each transmission cycle suitable for the transmission of voice signals without variable buffering delays, wherein said system has a fixed maximum capacity of packet cells that can be transmitted thereon, said system comprising:

a plurality of slave units to receive downstream, and to transmit up-stream, packet cells, with the number of contiguous up-stream packet cells being transmittable by each of said plurality of slave units being individually controllable;

a FTU/headend processor to individually address, and to control the number of packet cells each of said slave units is permitted to transmit up-stream;

a cable system to interconnect said plurality of slave units to said FTU/headend processor, said cable system includes:

a downstream communications channel to convey downstream packet cells from said FTU/headend processor to each of said slave units; and an up-stream communications channel to transmit up-stream packet cells from each said slave unit to said FTU/headend processor;

said FTU/headend processor includes a program to:

poll said slave units during each transmission cycle;

issue downstream packet cells including authorization commands to individually instruct each slave unit as to when to transmit and the number of contiguous up-stream packet cells that said each slave unit is authorized to send during a subsequent transmission cycle; and implicitly determine the number of contiguous up-stream packet cells each slave unit is authorized to transmit up-stream based upon the difference between said maximum capacity of packet cells said each slave unit was authorized to transmit during previous transmission cycle minus the actual number of packet cells said slave unit transmitted during said previous transmission cycle.

2. A communications system as in claim 1 wherein said cable system further includes:

a communications cable having a first section coupled to said FTU/headend processor and a second section coupled to said plurality of slave units, said communications cable to conduct the packet cells of said downstream and up-stream communications channels; and a multiplexer intermediate said first and second sections of said communications cable to interlace said packet cells of said up-stream and downstream communications channels onto said communications cable.

3. A communications system as in claim 2 wherein said communications cable is a single optical fiber.

4. A communications system as in claim 2 wherein said communications cable is a single coaxial cable.

5. A communications system as in claim 2 wherein said communications cable includes an optical fiber and a coaxial cable.

6. A communications system as in claim 1 wherein said cell packets are international standard 53 byte Asynchronous Transfer Mode cells.

7. A communications system as in claim 1 wherein the transmission time of a signal the full length of said downstream and up-stream communications channels is equivalent to at least 10 percent of the length of a single cell packet.

8. A communications system as in claim 1 wherein said FTU/headend processor program uses th number of authorized packet cells for each slave unit for an immediately preceding transmission cycle to the transmission cycle for which the FTU/headend processor program is determining the number of contiguous packet cells that each one of said plurality of slave units is to be allocated.

9. A dynamic adaptive polling arrangement as in claim 1 wherein said FTU/headend processor operates in a frequency band having a lower cut-off frequency that is above the highest frequency of the commercial TV passband.

10. A dynamic adaptive polling arrangement as in claim 1 wherein said FTU/headend processor operates in a frequency band having a highest cut-off frequency that is below the lowest frequency of the commercial TV passband.

11. A packet cell communications system as in claim 1 for the bi-directional transmission of packet cells to communicate with a plurality of subscriber cordless transceivers wherein:
said up-stream communications channel conducts packet cells bi-directionally between said FTU/headend processor and each of said plurality of slave units;
said FTU/headend processor also receives packet cells from each of said plurality of slave units; and
each of said plurality of slave units responds only to packet cells addressed to itself, and transmits packet cells up-stream to said FTU/headend processor upon receipt of instructions from said FTU/headend processor to do so.

12. A packet cell communications system as in claim 11 wherein at least one of said plurality of slave units includes:
a bi-directional resynch and command transmitter connected to said up-stream communications channel;
a bi-directional time transformer connected to said bi-directional resynch and command transmitter; and
a processor and rf transceiver section connected to said bi-directional time transformer and via an rf link with at least one of said plurality of subscriber cordless transceivers.

13. A packet cell communications system as in claim 11 wherein said FTU/headend processor alternately sends and receives packet cells to and from each of said plurality of slave units.

14. A packet cell communications system as in claim 11 wherein:
said up-stream communications channel includes;
at least one fiber optic cable having up-stream and downstream ends; and
at least one drop cable connected between one of said plurality of slave units and said fiber optic cable; and
said system further includes:
a first bi-directional optical-electrical interface interconnecting the up-stream end of said at least one fiber optic cable to said FTU/headend processor; and
a multiplicity of second bi-directional optical-electrical interfaces each connected between a different one of said at least one drop cable.

15. A shared communication transmission distribution system for the bi-directional transmission of cell packets over a cable TV broadcast distribution system as a shared communications channel, said system comprising:
a first bi-directional transmission path; and
a second bi-directional transmission path;
wherein said first bi-directional transmission path includes:
a first feeder cable having an up-stream end and a downstream end having a defined length therebetween divided into an up-stream section and a downstream section;
a first feeder amplifier serially connected between said up-stream and downstream sections of said first feeder cable to convey broadcast TV signals downstream on said first feeder cable, wherein said feeder amplifier has a downstream terminal;
a first bandpass filter having a first terminal coupled to said downstream terminal of said first feeder amplifier and a second terminal connected to said downstream section of said first feeder cable, said first bandpass filter having a lower cut-off frequency and an upper cut-off frequency with frequencies of the commercial TV band being between said lower and upper cut-off frequencies;
a first tap along the length of said downstream section of said first feeder cable downstream of said first bandpass filter, with said first tap having an upper cut-off frequency that is above the upper cut-off frequency of said first bandpass filter;
a first drop cable having an up-stream end connected to said first tap, and having a downstream end;
a first slave transceiver connected to the downstream end of said first drop cable to receive downstream signals from said first drop cable and to deliver up-stream signals to said first drop cable; and
a first low ,pass filter having a downstream terminal and an up-stream terminal, said downstream terminal being connected to said second terminal of said first bandpass filter and said up-stream terminal being coupled to said up-stream section of said first feeder cable up-stream of said first feeder amplifier, said first low pass filter having an upper cut-off frequency that is below the lower cut-off frequency of said first bandpass filter;
wherein said second bi-directional transmission path includes:

a second feeder cable having a first section with said first section having a first end and a second end;

a first high pass filter having an up-stream terminal coupled to said second end of said first section of said second feeder cable and a downstream terminal connected to said downstream terminal of said first bandpass filter wherein said first high pass filter has a lower cut-off frequency that is above the upper cut-off frequency of said first bandpass filter; and an FTU/headend processor coupled to first end of said first section of said second feeder cable to send packet cells to and from said first slave transceiver ; and wherein said first slave transceiver, responsive only to packet cells addressed to itself, upon receipt of instructions from said FTU/headend processor transmits packet cells to said FTU/headend processor, and wherein the transmission of said packet cells is restricted to frequencies above the upper frequency of said commercial TV band.

16. A shared communication transmission distribution system as in claim 15 wherein said packet cells are Asychronous Transfer Mode compliant.

17. A shared communication transmission distribution system as in claim 15 wherein said FTU/headend processor alternately sends and receives packet cells to and from said first slave transceiver.

18. A shared communication transmission distribution system as in claims 15 wherein:

said second feeder cable includes a fiber optic cable; and said second bi-directional transmission path further includes:

a first bi-directional optical-electrical interface interconnecting the upstream end of said fiber optic cable to said FTU/headend processor;

a second bi-directional optical-electrical interface coupled up-stream to said fiber optic cable downstream of said FTU/headend processor; and a first rf transceiver serially connected between said second bi-directional optical-electrical interface and said up-stream terminal of said first high pass filter, and said first rf transceiver having a center frequency that is above the upper cut-off frequency of said first bandpass filter.

* * * * *